United States Patent [19]

Mirza et al.

[11] Patent Number: 5,357,618
[45] Date of Patent: Oct. 18, 1994

[54] CACHE PREFETCH AND BYPASS USING STRIDE REGISTERS

[75] Inventors: Jamshed H. Mirza, Woodstock, N.Y.; Steven W. White, Austin, Tex.

[73] Assignee: International Business Machines Corporation, Armonk, N.Y.

[21] Appl. No.: 686,221

[22] Filed: Apr. 15, 1991

[51] Int. Cl.⁵ .......................... G06F 13/14
[52] U.S. Cl. ................................. 395/400
[58] Field of Search .......... 364/DIG. 1, 200; 395/800

[56] References Cited

U.S. PATENT DOCUMENTS

| | | | |
|---|---|---|---|
| 4,888,679 | 12/1989 | Fossum et al. | 395/800 |
| 4,984,151 | 1/1991 | Dujari | 364/200 |
| 5,093,777 | 3/1992 | Ryan | 364/DIG. 1 |

OTHER PUBLICATIONS

A. J. Smith, "Sequential Program Prefetching in Memory Hierarchies", IEEE Computer, Dec. 1978, pp. 7–21.
Pomerane et al., "Base/Displacement Lookahead Buffer", IBM Technical Disclosure Bulletin, vol. 22, No. 11, Apr. 1980, p. 5182.
Gindele, "Buffer Block Prefetching Method", IBM Technical Disclosure Bulletin, vol. 20, No. 2, Jul. 1977, pp. 696–697.

*Primary Examiner*—David L. Robertson
*Assistant Examiner*—Ngoc-Nu Nguyen
*Attorney, Agent, or Firm*—Floyd A. Gonzalez; Sean M. McGinn; Robert L. Troike

[57] ABSTRACT

A technique and a mechanism accurately determines the correct prefetch line for loops with strides of 1, N, or a combination of stride values. Stride registers are used to assist in prefetching. Furthermore, stride register values can be used to specify "cacheability" of data on an object by object basis to prevent "cache flushing". The compiler uses a new instruction, "MOVE GPR TO STRIDE REGISTER", prior to a loop to insert the "calculated stride value(s)" into the stride register(s) associated with the index register(s) which will be incremented by that stride value. At the end of the loop, a second new instruction, "CLEAR STRIDE REGISTER SET", is used to place a value of zero in all of the stride registers to inhibit prefetching of data which would most likely not be used. A zero value in the stride registers inhibits prefetching. Non-zero values in the stride registers clearly mark the execution of a loop, which is where prefetching makes the most sense. It also clearly indicates the correct offset from the current address to use in determining the prefetch address. Since the offset is dependent on the particular index register used in specifying the storage address, data for loops with multiple strides can be correctly prefetched. A hardware managed set of stride registers provides a subset of the benefits afforded by the software managed implementation.

10 Claims, 3 Drawing Sheets

```
CURRENT COMPILER
        L   GPR2,...            ADDRESS OF FIRST ELEMENT
        L   GPR7,...            STRIDE VALUE
LOOP ┌─
     │ L   ...,GPR2            GET VALUE
     │
     │ A   GPR2,GPR2,GPR7      UPDATE
     └─
```

FIG.2
Prior Art

```
REVISED COMPILER
        L   GPR2,...            ADDRESS OF FIRST ELEMENT
        L   GPR7,...            STRIDE VALUE
      * GPR7-->STR2
LOOP ┌─
     │ L   ...,GPR2            GET VALUE
     │
     │ A   GPR2,GPR2,GPR7      UPDATE
     └─
      * CLEAR STRIDE REGISTER SET
```

FIG.3

```
        REAL A(50,100,100)

MAX = 0
        SUM = 0
        DO 3 I=1,50
            IF(SUM.GT.MAX) MAX = SUM
            DO 2 J=1,100
                DO 1 K=1,100
                    SUM = SUM + A(I,J,K)
    1           CONTINUE
    2       CONTINUE
    3   CONTINUE
```

FIG.4

CACHE PREFETCH AND BYPASS USING STRIDE REGISTERS

BACKGROUND OF THE INVENTION

1. Field of the Invention

The present invention generally relates to data processing systems employing cache memories to improve the performance of the central processing unit (CPU) and, more particularly, to the use of "stride register(s)" to assist in prefetching data, especially for program loops.

2. Description of the Prior Art

Computer system performance is extremely dependent on the average time to access storage. For several generations of machines, cache memory systems have been used to decrease the average memory latency to an acceptable level. In cache systems, the average memory latency can be described as the cache access time multiplied by the percentage of accesses found in the cache (hits) plus the percentage of accesses not found in the cache (misses) times the "out-of-cache" access time. Due to the large discrepancy between the access times for a hit and for a miss, which is sometimes more than a factor of ten, even a small percentage of accesses being misses can result in the effects of the "out-of-cache" access time dominating the average memory latency. Being able to increase the cache hit ratio from 97% to 99% can result in a substantial performance improvement on the order of 20% to 40%. In an effort to increase the hit percentage, many different approaches have been described which attempt to prefetch cache lines on the basis of previous hit/miss information, accessing patterns, and so forth.

Since the cache is often completely transparent to the user, hardware must make prefetching predictions with no knowledge of the type of program, whether the current instructions were generated for code in a loop (which would have a bearing on whether a particular access pattern was likely to be repeated), or whether future instructions would reference data in a given cache line. As the code is being executed, it is difficult for hardware to reconstruct loops, especially iteration counts, until the loop is finished.

Still, attempts to accurately prefetch data can be profitable. Through trace driven simulation, A. J. Smith reported in "Sequential program prefetching in memory hierarchies", *IEEE Computer*, 11, 12 (December 1978), pp. 7-21, finding that "Prefetching all memory references in very fast computers can increase effective CPU speed by 10 to 25 percent." Smith, however, was only concerned with prefetching the line with the "next sequential (virtual) address". J. D. Gindele in "Buffer block prefetching method", *IBM Tech. Disclosure Bull.*, 20, 2 (July 1977), pp. 696-697, states "With prefetching, equivalent hit ratios can be attained with a cache buffer of only ½ to 1¼ capacity of a cache buffer without prefetching." Gindele's method worked well in cases where the next sequential cache line was the correct line to prefetch. When successive elements are quite distant (in linear address space), sequential address prefetch not only pollutes the cache with data the processor may never reference, the line which the processor will require is never prefetched. Almost every prefetch scheme assumes that the correct line to prefetch is simply the next sequential line. One exception is reported by J. H. Pomerene et al. in "Displacement lookahead buffer", *IBM Tech. Disclosure Bull.*, 22, 11 (April 1980), p. 5182.

In many scientific/engineering applications, most of the time is spent in loops. Much of the loop time is often spent in nested loops, and a lot of nested loops make use of multi-dimensional arrays. For the internal storage representation of multi-dimensional arrays, a column-wise mapping is assumed as is used in FORTRAN. In the case that the inner loop steps down columns, "stride-1" accesses (adjacent elements in storage) result. Most cache designs perform well in this case since when one element is fetched into the cache, a line (or group of contiguous elements) are fetched. A miss might occur for the first access to the line, but hits are assumed for the next several accesses.

When the inner loop moves across rows, stride-N accessing occurs, where the distance between consecutively referenced addresses is N words. Generally, N is larger than the number of elements fetched in the line; therefore, unless the data remains in the cache long enough to be used on the next row (a future iteration of an outer loop), misses will probably occur for each request, degrading performance. Some numerical solution methods used in scientific and engineering programs, such as Alternating Difference Implicit, sweep the data in several directions. Without careful coding, large arrays will "flush" the cache and no reuse will occur. Each access generates a miss which in turn increases the amount of time the processor sits idle waiting for data. The amount of degradation can be diminished if the cache lines can be prefetched so that the line fetched can be overlapped with other calculations in the loop.

While the term "stride" is described above in terms of scientific applications, this invention is aimed at solving a problem which is characterized by storage referencing patterns rather than computational attributes. For example, other potential candidates which might benefit from this invention include portions of applications in the areas of database and payroll processing which access a given field in each of a set of fixed-length records. These would result in accesses with a stride which is the same as the record length.

SUMMARY OF THE INVENTION

It is therefore an object of the present invention to provide a technique for the accurate determination of the correct prefetch line for loops with strides of 1, N, or a combination of stride values.

It is another object of the invention to provide a mechanism to accurately determine when "cache bypassing" should be used to prevent "cache flushing".

According to the invention, there are provided stride registers to assist in prefetching. The compiler uses a new instruction, "MOVE GPR TO STRIDE REGISTER", prior to a loop to insert the "calculated stride value(s)" (used in current machines as an address increment) into the new stride register(s) associated with the index register(s) which will be incremented by that stride value. At the end of the loop, a second new instruction, "CLEAR STRIDE REGISTER SET", is used to place a value of zero in all of the stride registers to inhibit prefetching of data which would most likely not be used. A zero value inhibits prefetching; therefore, codes which do not include these new instructions perform exactly as they do on a machine without the stride registers. Backward compatibility is also provided. The new instructions are simply treated as a "no-ops" in models that do not support the stride registers. Since information in these registers is used for performance reasons and has no functional impact, there is no need to save and/or restore these registers.

Non-zero values in the stride registers clearly mark the execution of a loop, which is where prefetching makes the most sense. It also clearly indicates the correct offset from the current address to use in determining the correct prefetch address. Since the offset is dependent on the particular index register used in specifying the storage address, data for loops with multiple strides can be correctly prefetched.

BRIEF DESCRIPTION OF THE DRAWINGS

The foregoing and other objects, aspects and advantages will be better understood from the following detailed description of a preferred embodiment of the invention with reference to the drawings, in which:

FIG. 2 is an illustration of code generated by a current compiler;

FIG. 3 is an illustration of the compiler-generated code which makes use of the stride registers according to the invention;

FIG. 4 is an illustration of pseudocode which exhibits a low reuse, cache flushing situation.

DETAILED DESCRIPTION OF A PREFERRED EMBODIMENT OF THE INVENTION

The invention rests on the recognition that the compiler has the best knowledge of the program's loop structure and accessing patterns. Often a stride value is calculated outside the loop to be used as an address increment inside the loop. The invention uses a set of "stride registers" and two instructions by which they can be modified. In the preferred embodiment of the invention, there is a one-to-one association between a stride register and a general purpose register. These stride registers are completely independent of any registers currently in the architecture.

Figure 1:
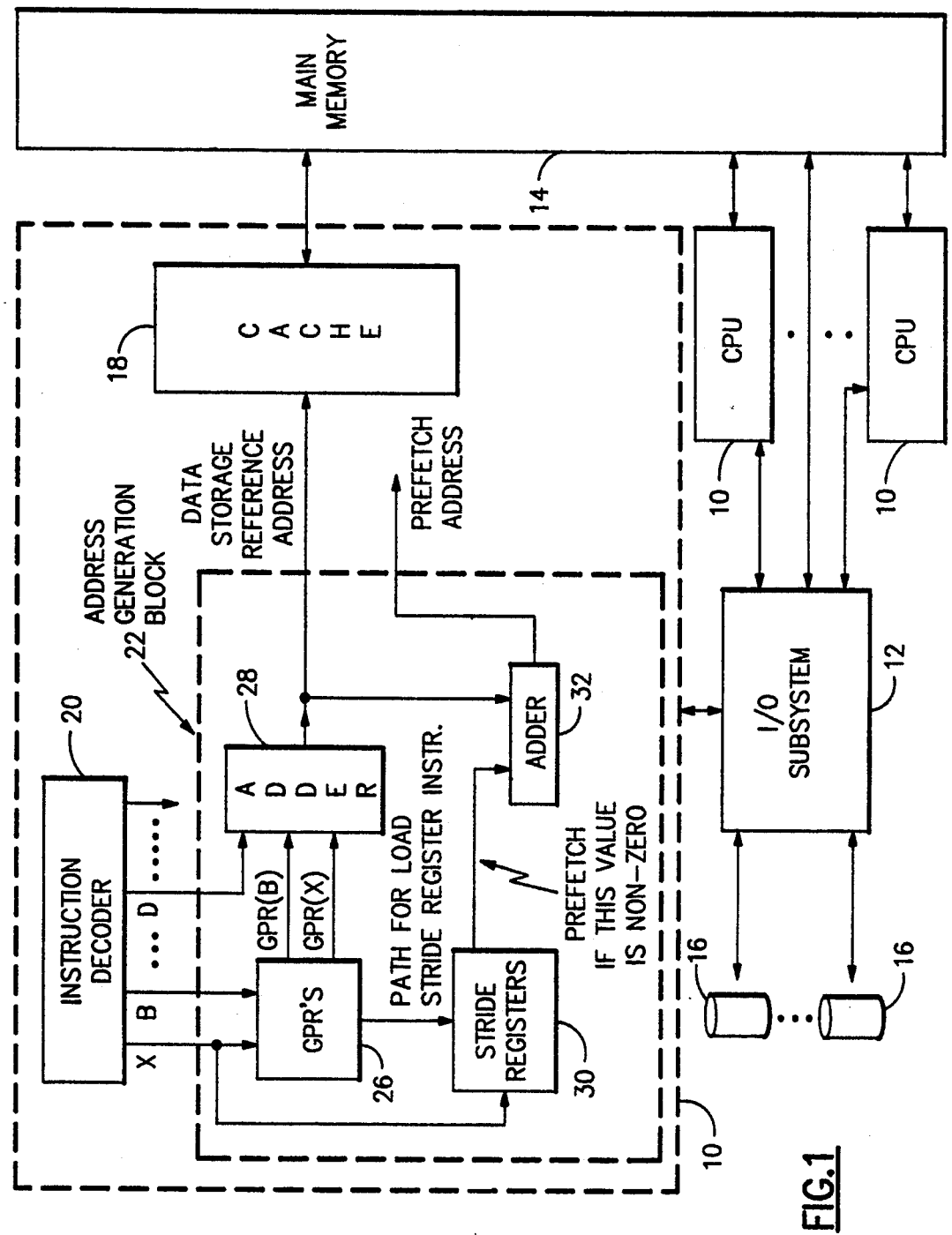
FIG. 1 is a block diagram showing a multi-processor computer system using software managed stride registers according to the invention.

Referring now to the drawings, and more particularly to FIG. 1, there is shown a multi-processor system comprising a plurality of central processor units (CPUs) 10, each connected to an input/output (I/O) subsystem 12 and communicating with a main memory 14. The I/O subsystem 12 also communicates with the main memory 14 and has several I/O paths to which are connected strings of direct access storage devices (DASDs) 16. This architecture is typical of modern main frame computers of which the IBM System/370 (S/370) family of computers is exemplary.

As shown in more detail in the upper CPU block 10 in FIG. 1, each CPU includes, in addition to an arithmetic logic unit and associated registers (not shown), a cache memory 18, an instruction decoder 20 and an address generation block 22. As is well understood in the art, the cache memory 18 is a faster memory than the main memory 14 which is itself loaded from the DASDs 16. These levels of storage create a storage hierarchy, the levels of which are characterized by decreasing speed but also decreasing cost and increasing capacity. The main memory stores the program instruction set and data objects which are referenced by an address generation mechanism in the CPU. A portion of the program instruction set and the most recently accessed data is placed in the cache memory 18 where it can be accessed much faster than from the main memory 14. However, if the next instruction or data word to be accessed is not found in the cache memory 18 (a miss), it must be accessed from the main memory 14.

The address generation block 22 is the mechanism that generates the address of the next data object according to address information from the decoder 20. This block comprises a plurality of general purpose registers (GPRs) 26 and an adder 28 which are used to generate the data storage reference address. As is typical in most modern main frame computers, the address decoded by the instruction decoder 20 is a virtual address formed from information specified by bit fields in the instruction. In the case of the IBM S/370, these fields can include a displacement (D) field, a base (B) field, and an index (X) field. The B and X fields each specify a GPR. The contents of the specified GPRs and the value in the displacement field of the instruction are added together to form the virtual address for the storage reference. As a special case, specifying $GPR_0$ results in a value of zero rather than the contents of $GPR_0$.

In particular, for loops in which data objects are referenced according to a pattern (with stride), a single base register, specified in the B-field of the instruction, is generally used to provide addressability, for example within a basic code module. The contents of the index register(s) (i.e., the GPRs specified in the X-field of the instructions) are used to point to object(s) relative to the pointer in the base register. Some of the instructions in the loop use the index registers in addressing data while others update the index registers to point to data for the next iteration. Given a base and index pair, the displacement field can be used to allow several instructions, with various displacement values, to reference several objects, or several elements of a common object, if the distance between the set of references for one iteration can be expressed in the number of bits in the displacement field of the instruction and if the distances are constant across iterations.

If, as is common, a given index register is updated once per iteration of the loop, then for each storage reference instruction in the loop, the address generated on the subsequent iteration will be the sum of the address generated for the current iteration and the amount added to the index register during the update. By definition, for data objects referenced with a stride in such a loop, the value by which the index register is updated is the stride and is known prior to entering the loop. More particularly, the stride value or index register increment is usually kept in another GPR for use in updating the index register. Even if more than one stride value exists within a given loop, there is a given stride value GPR for any given index register. There may be more than one index register being updated by a single stride GPR, as is often the case when several objects are referenced with a common stride.

The foregoing represents hardware currently implemented in, for example, the IBM System/370 family of main frame computers. The subject invention adds to this hardware stride registers 30 and a second adder 32. The stride registers 30 are loaded in response to a new instruction, "MOVE GPR TO STRIDE REGISTER", decoded in instruction decoder 20. The values loaded into the stride registers are the stride values associated with storage references made using the corresponding GPRs as index registers. The stride value from a selected stride register 30 is summed in adder 32 with the data storage reference address generated by adder 28 to produce the prefetch address. If the stride register value is not zero, then the data will be prefetched from main memory 14 into the cache memory 18, if it is not already present in the cache memory 18. A second new instruction, "CLEAR STRIDE REGISTER SET", is used to place a value of zero in all of the stride registers, thereby inhibiting further prefetching of data.

The stride register hardware according to the invention cooperates with the compiled program instruction set to permit correct prefetching of successive elements which may or may not be in consecutive lines of memory, and this is accomplished without the degradation usually associated with prefetching; i.e., the additional memory activity and cache pollution. Moreover, compiler knowledge of expected data reuse may be used by the cache to determine whether or not data should be cached, on an object-by-object basis. The stride registers of this invention primarily benefit programs which step through data in a regular pattern (constant stride), and typical compilers include FORTRAN, PL/1 and Pascal. In addition, application programs such as relational databases may benefit from the use of the invention. To illustrate the compiler's operation with respect to stride registers, the FORTRAN compiler is taken as an example.

The FORTRAN compiler currently generates (and uses) the information required to utilize the stride registers according to the invention; it is simply a matter of inserting a few instructions in known areas. Currently, as shown in FIG. 2, the compiler recognizes the top and bottom of a loop. For objects which are addressed with a constant stride, a pair of values are determined. The first is the address (pointer) used in the first iteration and the second is the offset or stride. A register is assigned to each stride value. Objects which are addressed with the same stride may use a common register. The register assignments are made at compile time, code is generated prior to the loop to determine the address and stride value, and code is generated within the loop (usually at the end) to update the address pointer by adding the appropriate stride value. For each iteration of the loop, one of the registers (GPR$_2$ in FIG. 2) is used as an index register which, along with the base register and displacement (not shown), is used to generate a virtual address for accessing storage for the required data element. Key points of this invention are (1) for a given instruction, the same index register is used for each iteration, (2) a given index register is updated only once per iteration, and (3) the amount by which a given index register is updated is constant for a set of iterations of the loop. Together, these three conditions allow a stride value (the contents of GPR$_7$ in FIG. 2) to be associated with the index register(s) which are updated by the given stride value (in this case the contents of GPR$_2$).

The two minor compiler changes, illustrated with asterisks in FIG. 3, which are required to take advantage of the stride registers' accurate prefetch capability are the following:

Prior to the loop, "MOVE GPR TO STRIDE REGISTER" instructions must be inserted to copy the contents of each GPR containing a stride value into the stride register(s) associated with the index register(s) which use this stride value. This action enables prefetching by establishing a binding between a GPR (used as an index register) and a stride value (saved in GPR$_7$ in FIGS. 2 and 3).

Immediately after the loop, an instruction, "CLEAR STRIDE REGISTER SET", or a sequence of instructions, "MOVE GPR TO STRIDE REGISTER" with a "0" source, must be inserted to clear the stride registers and hence disable prefetching.

Due to the nature of the stride registers, their use does not require a change to the register assignment algorithm when there is a one-to-one assignment between a data object and a GPR to be used as an index register. When a limited number of GPRs force a single GPR to be used as an index register for multiple objects, proper register assignment would be such that objects which are accessed with the same stride are assigned a common index GPR or set of GPRs. As an implementation note, the stride registers may be zeroed during a context switch to prevent inadvertent prefetching.

While compiler technology can be easily adapted to the use of stride registers to provide hardware with the information necessary to improve cache performance through prefetching, a more difficult set of compiler changes are required to make use of the second major capability of stride registers; i.e., passing compiler detected data reuse information to the hardware. The pseudocode shown in FIG. 4 illustrates a situation which will have low reuse of the data in a cache as a result of cache flushing. The statement "IF(SUM.GT.MAX) MAX=SUM" makes it difficult for the compiler to interchange loops. Therefore, for each iteration of the I loop, 10,000 (100 times 100) elements of the A matrix will be referenced. Since the elements referenced (in a given iteration of the I loop) are separated by 200 (50 times four) bytes, they are likely to be in distinct cache lines. The cache line fetched for a given pair of J and K values will usually contain the elements used on subsequent iterations of the I loop, for the same J and K values, since A(I,J,K) and A(I+1,J,K) are adjacent in storage.

Most current caches do not have the capacity to save 10,000 distinct lines; therefore, the data brought in near the end of a given iteration of the I loop will flush most of the data which was fetched at the beginning of the iteration and which would have been used on the subsequent iteration. Thus, although all the data fetched in any given cache line will be referenced in some other iteration of the I loop, essentially each access represents a cache miss. Here the term "miss" refers to requiring the memory to cache transfer whether or not the processing unit must wait.

Although stride registers will not prevent this miss per access for the A matrix, it can help in two ways. As noted above, the amount of degradation which results from cache misses can be diminished if the prefetch can be overlapped with other computations in the loop. In this case, the penalty per miss is decreased, but the number of actual memory to cache transfers remains the same, or slightly increases. The second source of improvement comes from an actual reduction in total memory to cache transfers by eliminating the unnecessary displacement of re-usable data from cache by the lines brought in to satisfy the references to the A matrix.

Consider the case where additional objects which fit entirely in the cache are being referenced in this loop, for example, arrays such as B(10,50) which are referenced as B(1,I), B(2,I), etc. They could remain resident if the references, and resulting misses, for the A matrix did not flush these objects. Since only one element is used in most of the cache lines brought in to satisfy the A matrix references, it would be preferable if only the single element could be fetched (rather than a line) and not pollute the cache with the rest of the line which will not be used.

By convention, the upper or most significant bit (MSB) in a stride register can specify "cacheability". For example, a "1" in the MSB position can indicate that a block of data following the data item being prefetched is to be cached, and a "0" can indicate non-cache; i.e., bring in only one data word. This procedure has the advantage of reducing memory and switch demand while diminishing cache pollution which allows high-reuse data to remain in the cache.

The invention is backward compatible with existing machines. Cache prefetch and bypass using information in the stride registers provides a performance advantage but it does not change the function of a program. Therefore, low-end machines not having this feature could ignore the stride register instructions by treating them as "no-ops". High-end machines could implement the hardware as described. Mid-range machines could support the mechanism for a subset of the general purpose registers. For example, if a designer chose to support prefetching and/or bypass for only accesses in which the index register was in a given set (say, the upper one fourth of the GPR set), he could implement only some of the stride registers (say, four in the case of the S/370's 16 GPRs) and examine the upper two bits of the index register field to determine whether a stride register is to be used. The remaining bits of the index register field could select a stride register.

Further simplification can be achieved by considering common stride values. For machines with cache, many programmers attempt to get most of their accesses to be stride one. The remaining stride values are usually small. A stride of one is common and can be represented with one bit; therefore, many of the stride registers may only contain one or a few bits, while others may only have twenty bits. (Twenty bits allows strides up to 1 MB!) For registers which implement N bits, all but the low-order N bits of a newly loaded value could be ORed to signal a value greater than the capacity of the associated stride register. The complement of this signal could then be ANDed bit-by-bit with the low-order N bits, providing a value of zero when the specified stride exceeded register capacity. Therefore, specifying stride values in excess of the capacity of a particular stride register would simply reset the stride register to zero. When a N-bit stride register is read (to calculate a prefetch address), zeroes would be supplied for the implied high-order bits.

The compiler, or programmer, which wishes to make use of the stride registers and their associated function would simply select index registers (during register allocation) for addressing an object such that the corresponding stride register was adequate to accommodate the stride for that object. Since stride registers provide a performance opportunity and not function, a program which is written for a specific implementation of stride registers will still produce the same (time-dependent) results on machines with more or less stride register support.

Figure 5:
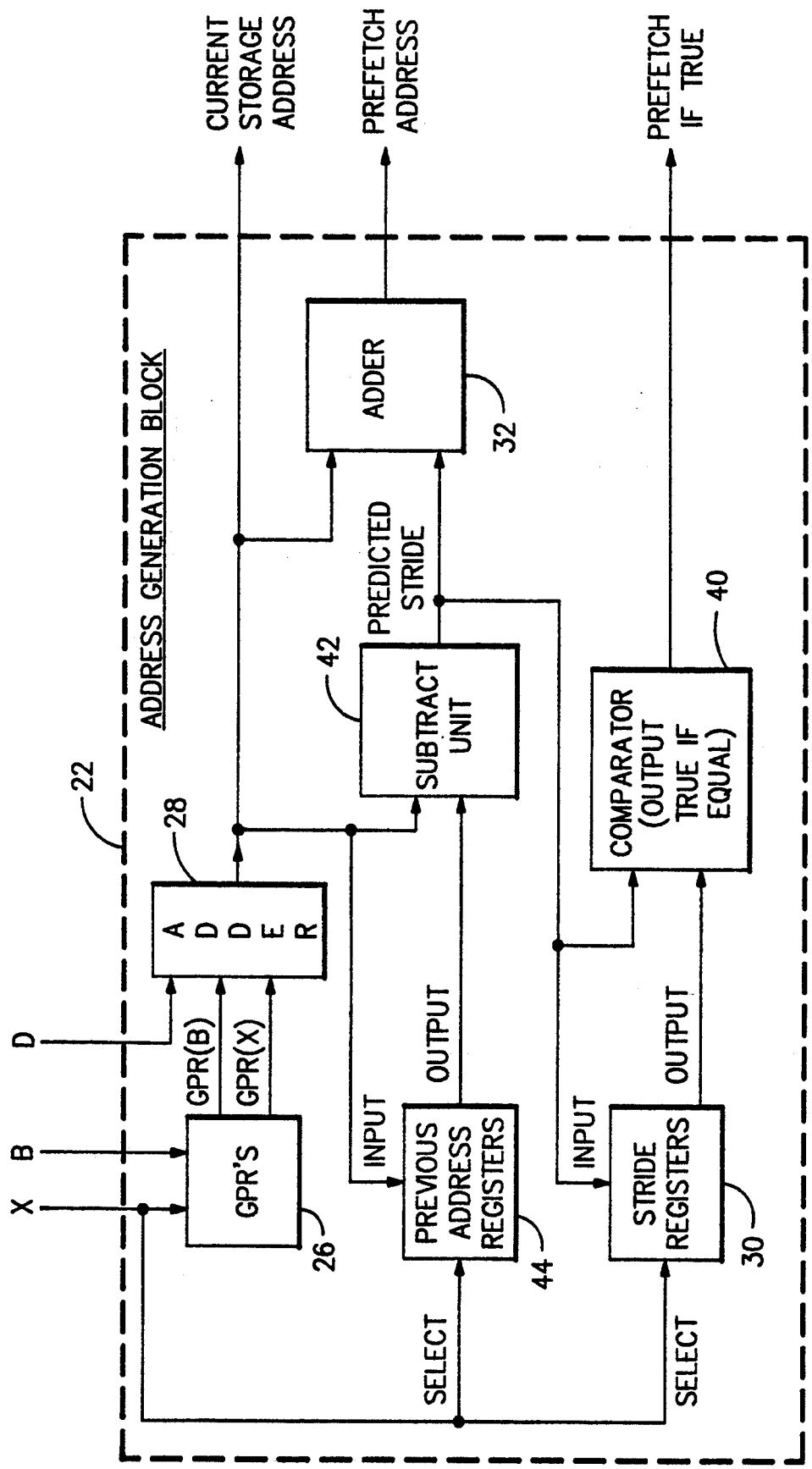
FIG. 5 is a block diagram showing a hardware managed implementation of the invention.

A close approximation to the above-described "software managed" stride registers is the hardware managed design shown in FIG. 5. The cacheability bit (or cache bypass) function is not supported in this implementation; however, in a loop where a stride pattern existed for consecutive accesses (in which a given GPR is specified in the index register field of the instruction), hardware can detect such a pattern. The difference between addresses for consecutive storage accesses (involving the given index register) can be determined and saved in the hardware managed stride registers.

In FIG. 5, like reference numerals denote identically the same structure as shown in FIG. 1. The GPRs, the adders, and the stride registers shown in FIG. 5 function essentially as those shown in FIG. 1. Since instructions will not be used to zero (i.e., reset) registers to inhibit prefetching, a comparator 40 is added to inhibit prefetching when a pattern does not exist. A subtract unit 42 and a set of "previous address" registers 44 have been added to allow determination of stride patterns. When a storage address is generated, the X-field is used to address the previous address register set 44 to select the previous address register which corresponds to the GPR which is currently being used as an index register. At the end of a given address generation cycle, the address generated to access main storage is saved in the selected previous address register 44. At the beginning of each address generation cycle, the contents of the selected previous address register (the previous storage address generated using the current index register) is read out. This value and the current address are sent to the subtract unit 42. The difference represents the stride if a pattern does exist.

This "predicted" stride value, from subtract unit 42, along with the contents of the currently selected stride register 30 are used to determine whether to prefetch. If the current value of stride register 30 matches the predicted stride, prefetch is performed. If the current value of stride register 30 do not match the predicted stride, no prefetch occurs. In either case, the predicted stride value is loaded into the selected stride register 30, rather than loading it using the "MOVE GPR TO STRIDE REGISTER" instruction as in the software managed implementation. Therefore, for a prefetch to occur, two or more consecutive stride predictions (i.e., three or more addresses since the stride is the difference between two addresses) must indicate that a pattern exists for accesses involving the given index register. Whenever it is determined that the pattern has been broken, prefetching is inhibited until a pattern is re-established. Since the stride predictions and prefetching operations are dependent on the particular index register used in specifying the storage address, data for loops with multiple strides can be correctly prefetched.

The major advantage of this approach over the software managed solution is that it is transparent to the user; however, the major drawback to this approach is, if two instructions in the loop use the same index (GPR) register (with different displacements), it will appear to the hardware that a pseudorandom pattern of addresses is being generated for a given index register. This is especially so in the general case since the number of storage references in a single loop which use the same index register is unlimited.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a computer system having a memory hierarchy including a main memory and a cache memory addressed by a central processing unit, said central processing unit including a plurality of addressing registers and an address generation mechanism for generating a data storage address to said cache memory, the improvement in said address generation mechanism comprising:

stride register means for storing a plurality of stride values respectively representing a displacement between consecutive ones of data storage addresses generated by said address generation mechanism for a storage reference instruction with a given specified addressing register, said stride register means including a plurality of stride registers corresponding in number to a number of said plurality of addressing registers of said computer system, respective ones of said plurality of stride registers being associated with respective ones of said plurality of addressing registers on a one-to-one basis;

storage reference instruction means for issuing said storage reference instruction for transferring data between said cache memory and said central processing unit, said storage reference instruction including at least one fixed bit field for specifying at least one addressing register, of said plurality of addressing registers, from which said at least one addressing register said data storage address is generated, said at least one fixed bit field also specifying at least one stride register of said plurality of stride registers;

at least one instruction means for altering a stride value of a specific stride register to a predetermined value, said at least one instruction means allowing storage of information, associated with the stride value, in the specified stride register by a programmer or an automated compiler;

control means responsive to a first instruction inserted prior to a program loop having a plurality of instructions, for loading at least one stride value into said stride register means and responsive to a second instruction inserted after an end of said program loop for clearing said stride register means; and means responsive to a non-zero stride value stored in said stride register means for generating a prefetch address to said cache memory.

2. The address generation mechanism recited in claim 1 wherein each stride register of said plurality of stride registers includes a most significant bit position, said address generation mechanism further comprising means for determining the value in the most significant bit position in a stride register, said value representing whether a block a data including a data item being prefetched is to be cached, a first logical value in the most significant bit position indicating that said block a data including said data item being prefetched is to be cached, and a second logical value in said most significant bit position indicating that only said data item of said block of data is to be prefetched.

3. The address generation mechanism recited in claim 1, wherein said control means includes means for passing compiler information, related to an application's data accessing patterns, including said at least one stride value in response to said first instruction and a clearing instruction corresponding to said second instruction for inhibiting a prefetch operation.

4. The address generation mechanism according to claim 1, wherein said means for generating said prefetch address includes means for adding said nonzero stride value to a most recently generated data storage address.

5. In a computer system having a memory hierarchy including a main memory and a cache memory addressed by a central processing unit, said central processing unit including a plurality of addressing registers and an address generation mechanism for performing an address generation cycle and thereby generating a data storage address to said cache memory, the improvement in said address generation mechanism comprising:

storage reference instruction means for issuing storage reference instructions for transferring data between said cache memory and said central processing unit, said storage reference instruction means including at least one fixed bit field for specifying at least one addressing register, of said plurality of addressing registers, from which said at least one addressing register said data storage address is generated;

stride register means including a plurality of stride registers for storing stride values respectively representing a displacement between consecutive ones of data storage addresses generated by said address generation mechanism for an address register specified by a storage reference instruction from said storage reference instruction means, said plurality of stride registers corresponding in number to a number of said plurality of addressing registers, respective ones of said plurality of stride registers being associated with respective ones of said plurality of addressing registers on a one-to-one basis;

previous address register means including a plurality of previous address registers for storing data storage addresses generated to access said cache memory, said data storage addresses being stored in a previous address register, of said plurality of previous address registers, specified by said at least one fixed bit field in said storage reference instruction at an end of said address generation cycle, said plurality of stride registers corresponding in number to a number of said plurality of previous address registers, respective ones of said plurality of stride registers being associated with respective ones of said plurality of previous address registers on a one-to-one basis;

subtraction means for subtracting a previous data storage address stored in said previous address register means for a current data storage address generated by said address generation mechanism to generate an output, said output being predicted stride value;

means responsive to a non-zero predicted stride value output by said subtraction means for generating a prefetch address to said cache memory; and comparator means for comparing a non-zero predicted stride value output by said subtraction means with a stride value stored in said stride register means to generate a prefetch enabling signal if a match occurs.

6. The address generation mechanism according to claim 5, wherein said means for generating said prefetch address includes means for adding said stride value to a most recently generated data storage address.

7. The address generation mechanism according to claim 5, further including means, coupled to said plurality of stride registers and said plurality of previous address registers, for determining whether a stride pattern exists and, for each previous address register, for determining differences between addresses for consecutive data storage accesses related to said each previous address register.

8. In a computer system having a memory hierarchy including a main memory and a cache memory addresses by a central processing unit, said central processing unit including a plurality of addressing registers, a plurality of stride registers corresponding in number to a number of said plurality of address registers, said plurality of addressing registers and said plurality of stride registers being paired on a one-to-one basis, and an address generation mechanism for generating a data storage address to said cache memory during an execution of a storage reference instruction, said storage reference instruction including at least one fixed bit field for specifying at least one pair of addressing registers and stride registers, a method for prefetching data into said cache memory comprising the steps of:

generating a current data storage address from said address generation mechanism using at least one addressing register specified by said at least one fixed bit field in said storage reference instruction;

storing at least one stride value prior to a beginning of a program loop to produce at least one stored stride value, said at least one stride value representing a displacement between consecutive ones of data storage addresses generated by said address generation mechanism for a given addressing register;

adding said at least one stored stride value selected by said at least one fixed bit field in said storage reference instruction to said current data storage address to generate a prefetching address; and clearing said at least one stride value at an end of the program loop.

9. The method recited in claim 8, further comprising a step of determining a value in a most significant bit position in a stride register of said plurality of stride registers, wherein said value in said most significant bit position in said stride register represents whether a block of data including a data item being prefetched is to be cached, the method further comprising the step of prefetching said block of data including said data item being prefetched when said most significant bit position is a first logical value but prefetching only said data item when said most significant bit is a second logical value.

10. In a computer system having a memory hierarchy including a main memory and a cache memory addressed by a central processing unit, said central processing unit including a plurality of addressing registers, a plurality of stride registers corresponding in number to a number of said plurality of addressing registers, a plurality of previous address registers equal in number to a number of said plurality of addressing registers, said plurality of addressing registers, said plurality of stride registers and said plurality of previous address registers being associated on a one-to-one-to-one basis, and an address generation mechanism for performing and address generation cycle and thereby generating a data storage address to said cache memory during an execution of a storage reference instruction, said storage reference instruction including at least one fixed bit field for specifying at least one triplet of addressing registers, stride registers and previous address registers, a method of prefetching data into said cache memory comprising the steps of:

generating a current data storage address from said address generation mechanism using a specified addressing register;

selecting a previous data storage address from a previous address register of said plurality of previous address registers using the at least one fixed bit field in said storage reference instruction;

selecting a stored stride value from said plurality of stride registers using the at least one fixed bit field in said storage reference instruction;

subtracting the previous data storage address from the current data storage address generated by said address generation mechanism to generate a predicted stride value;

generating a prefetch address to said cache memory based on said predicted stride value and said current data storage address;

comparing said predicted stride value with the stored stride value to generate a prefetch enabling signal if a match occurs;

storing said predicted stride value in one stride register of said plurality of stride registers, said stored stride value respectively representing a displacement between consecutive ones of data storage addresses generated by said address generation mechanism for a given instruction, the predicted stride value being stored at an end of said address generation cycle in said one stride register of said plurality of stride registers specified by said at least one fixed bit field in said storage reference instruction; and storing said data stored addresses generated to access said cache memory, said data storage addresses being stored in the previous address register specified by said at least one fixed bit field in said storage reference instruction, at an end of said address generation cycle.

* * * * *